United States Patent [19]

Waldroop et al.

[11] Patent Number: 5,033,225
[45] Date of Patent: Jul. 23, 1991

[54] APPARATUS FOR USE IN CATCHING FISH

[76] Inventors: Jerry H. Waldroop, 6971 E. 20th St., Tulsa, Okla. 74112; Larry J. Vann, Rte. 2, Inola, Okla. 74036

[21] Appl. No.: 591,448

[22] Filed: Oct. 1, 1990

[51] Int. Cl.⁵ ............................................. A01K 91/00
[52] U.S. Cl. ................................. 43/43.11; 43/43.15; 215/228; 215/211
[58] Field of Search ............... 43/4, 43.11, 43.15, 43/43.1; 215/227, 228, 211

[56] References Cited

U.S. PATENT DOCUMENTS

| | | |
|---|---|---|
| 1,764,738 | 6/1930 | Marsters . |
| 2,435,011 | 1/1948 | Mason ........................... 43/41 |
| 2,447,166 | 8/1948 | Daffer ...................... 215/228 X |
| 2,586,170 | 2/1952 | Lawrenz ..................... 43/43.11 |
| 2,803,083 | 8/1957 | Moore ....................... 43/44.93 |
| 2,924,039 | 2/1960 | Morton ..................... 43/43.11 |
| 3,154,063 | 10/1964 | White ............................. 124/20 |
| 3,163,957 | 1/1965 | Barrett ....................... 43/41.2 |
| 3,753,309 | 8/1973 | Bryant ........................ 43/17.5 |
| 3,763,590 | 10/1973 | Meulnart .................... 43/43.11 |
| 4,607,449 | 8/1986 | Brachear ..................... 43/43.11 |
| 4,709,822 | 12/1987 | Vataru ........................ 215/228 X |

Primary Examiner—Richard K. Seidel
Assistant Examiner—Patty E. Hong
Attorney, Agent, or Firm—Head & Johnson

[57] ABSTRACT

An apparatus for use in catching fish having a container with a threaded opening at one end, a closure having opposed first and second ends both of which are internally threaded to be threadably receivable on the container opening, the closure having an intermediate wall between the two threaded ends, an elongated rod member extending from the closure member wall, a fishing line having a fishhook at one end, the other end being attached to the closure member and the line being windable upon the elongated rod member so that when the line is wound on the rod member, the rod member can be inserted and contained within the container, but when used for fishing the rod member extends externally of the container and the line having a fishhook thereon is unwound so that the container provides flotation for the line and hook.

9 Claims, 1 Drawing Sheet

APPARATUS FOR USE IN CATCHING FISH

SUMMARY OF THE INVENTION

A commonly used method of catching fish in a body of water is referred to as "jug fishing" that is, a flotation device, usually a container such as an empty milk cartoon or the like, having a fishing line attached to it. At the other end of the fishing line is a hook and usually a sinker. Bait is placed on the hook and the device is released. A number of "jugs" with fishing lines attached can be released in an area. As the wind or water currents move the device around, the fishhook with bait thereon is exposed to different parts of the body of water.

When a fish bites and is caught on a hook the action of the fish is readily apparent from the water surface, since the container or "jug" will move noticeably in response to the action of the fish. The fisherman can then observe a large number of jugs, and by a boat move to the one having a fish thereon as indicated by the up and down action of the container on the water surface.

One problem with this type of fishing is that of transporting a number of containers or "jugs" with fishing lines attached thereto. In some instances, the fisherman removes the fishing lines and winds them on a spool and then reattaches the lines when they are ready to fish. This procedure is satisfactory except it is very time consuming since it requires detachment of the fishing lines when fishing is terminated and reattachment when fishing is to be resumed.

Others have utilized containers having means on the external surface area for winding the fishing lines thereon. This is convenient in that the fishing lines do not have to be removed and reattached each time, but this can also be a problem since this arrangement leaves the fishhook, attached to the fishing line, exposed with the consequent hazard that the hooks can snare and be embedded in a person or, at least, become entangled with other objects.

The present invention is directed toward an apparatus for use in catching fish and particularly an apparatus for use in "jug fishing" which eliminates the need to attach and reattach a fishing line from the flotation device or container in a way which fully encloses the fishing line and fishhook thereon when the device is not being used for fishing.

The apparatus for use in catching fish of this invention is in the form of a container having an opening at one end thereof. The opening is typically a reduced diameter portion having threaded ends, such as a typical bottle or jug. A closure member is utilized in combination with the container. The closure member has opposed ends, and each end is internally threaded and is threadably receivable upon the container threaded opening. The interior of the closure member has a wall therein between the opposed ends so that whichever end is utilized to thread onto the container serves to close the interior of the container.

Extending from the closure member, and preferably extending directly from the interior closure member wall, is an elongated rod member dimensioned so that it is fully receivable within the container. A fishing line has one end attached to the closure member, such as to the rod member. One end of the fishing line has a fishhook attached thereto, and, in addition, a fishing weight may be placed on the line adjacent the fishhook. The fishing line is windable onto the rod member.

When the container is ready to be used for fishing the closure member is removed from the container and is threaded onto the container so that the rod member extends externally of the container. The fishing line can then be unwound therefrom, bait attached to the fishhook and the container is then cast into the water. The fishing line is then free to extend downwardy in the water with the baited hook thereon. The closure member closes the container in an air-tight arrangement so that the container floats on the water surface.

When the fisherman is through fishing and is in the process of gathering up the fishing devices from the surface of the water, the fishing line with a hook thereon is first wound onto the rod member. Thereafter the closure member is unthreaded from the container, the rod member inserted into the interior of the container and the closure member threaded back onto the container. In this way the rod member with the fishing line and fishhook thereon is stored within the container when the device is not in actual use for fishing. This ensures that when the container is in the storage mode the fishing line and fishhook thereon are completely contained within the container, and the fishhook is not exposed to be unintentionally caught on a person or other equipment. By use of the apparatus of this invention, a large number of containers may be easily stored together without any possibility of injury or without the disagreeable problem of fishing lines becoming entangled with each other.

In a preferred arrangement the container may be of the expandable/collapsible type so that when in the stored condition, the container can be collapsed to utilize relatively little space, but when ready to be used for fishing it is expanded to substantially increase the flotation capability. In this way the expanded container can resist being carried beneath the surface of the water by relatively large fish while, at the same time, in the stored condition, the container takes up relatively little space.

Others have provided improved container assemblies for use in fishing and for reference to related fishing apparatuses see the following U.S. Pat. Nos. 1,764,738; 2,435,011; 2,586,170; 2,803,083; 3,154,063; 3,163,957; 3,753,309; 3,763,590; and 4,607,449.

A better understanding of the invention will be had by reference to the following description and claims, taken in conjunction with the attached drawings.

DESCRIPTION OF THE PREFERRED EMBODIMENT

Figure 1:
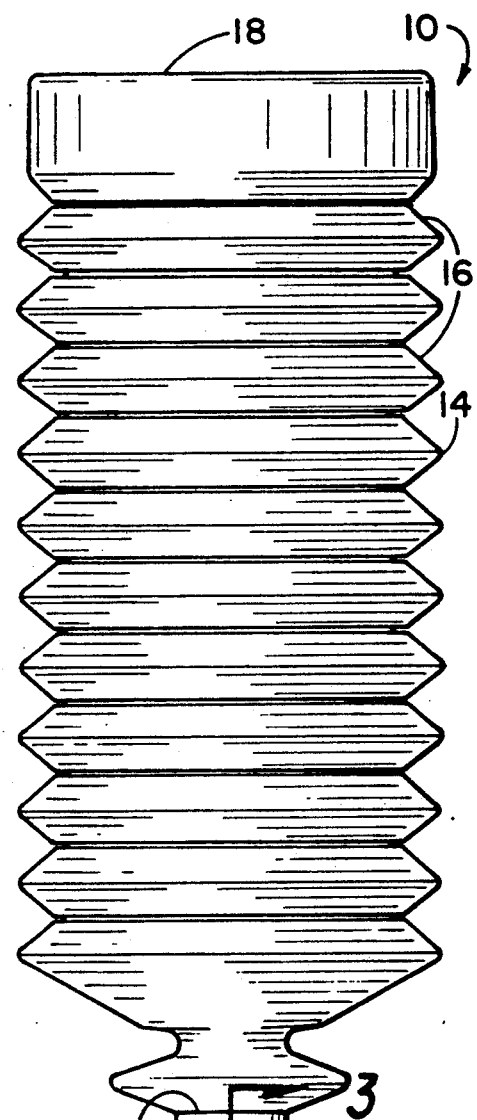
FIG. 1 is an elevational view of an apparatus for use in catching fish according to this invention and showing the use of an expandable container, with the container expanded and with the apparatus in use for positioning in the water for flotation on the surface of the water and with the fishing line extending therefrom.

Referring to the drawings and first to FIG. 1, the apparatus for use in catching fish of this invention includes a container, generally indicated by the numeral 10. While the container 10 may be of the fixed type, the preferred embodiment as illustrated employs an expandable container. The expandable container includes a generally cylindrical sidewall 14 formed of a series of pleats 16. The container has a first end 18 and an opposed second end 20 which, as best illustrated in FIG. 3, has a reduced external diameter portion 22 having external threads 24 thereon.

Figure 2:
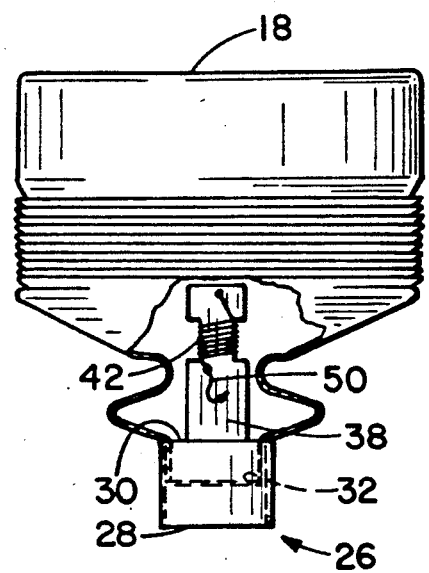
FIG. 2 is an elevational view of the container of FIG. 1 in the collapsible position, with the container shown partially cut away and with the apparatus in the storage mode, that is, wherein the apparatus is secured with the fishing line internally of the container.

FIG. 1 shows the container 10 in the expanded position which is achieved by pulling the ends 18 and 20 apart. The container can be collapsed, as shown in FIG. 2, by pushing the ends together. Containers of the type illustrated herein are known and are commercially available, and the invention is not limited to the use of such container but the expandable container is the preferred method of practicing the invention, and therefore, is illustrated in detail in the drawings. Expandable containers of the type illustrated are available commercially and are used such as for campers and hikers. The containers are expanded, as shown in FIG. 1, and used for retaining water or other beverages. When the beverages have been consumed the container can be collapsed, as shown in FIG. 2, to substantially reduce the storage area. This invention makes use of this commercially available container structure for a highly improved and convenient fish catching mechanism.

The second important element of the invention is the closure member, generally indicated by the numeral 26. The closure member is best shown in the cross-sectional view of FIG. 3. The closure member is cylindrical with opposed ends 28 and 30. Intermediate the ends 28 and 30 is an internal integral wall 32. Internal threads 34 are provided in the closure member between wall 32 and first end 28. In like manner, internal threads 36 are provided between the closure member 32 and the second end 30. By the provision of threads 34 and 36 the closure member is threadable onto the container tubular portion 22 in two different modes, and in either mode the internal wall 32 serves to close of and seal the interior of container 10.

Figure 3:
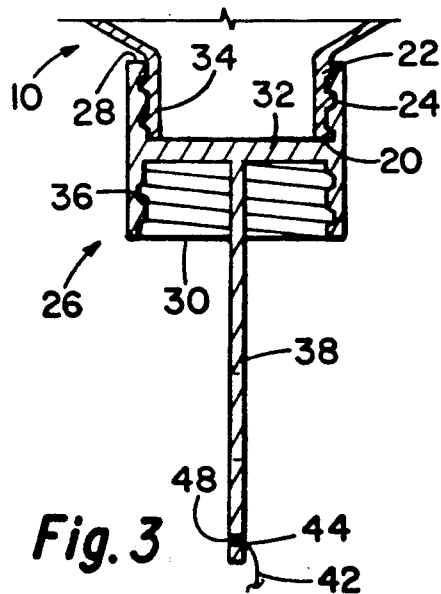
FIG. 3 is an enlarged partial cross-sectional view taken along the line 3—3 of FIG. 1 showing the closure member and the elongated rod member formed integrally therewith.

Extending from the container and preferably, as illustrated in FIG. 3, from the internal wall 32 is an elongated rod member 38. The rod member may be of various cross-sectional shapes. In the illustrated arrangement it is flat and has an outer end 40. The function of rod member 38 is to provide a convenient spool for winding a fishing line 42 thereon. The fishing line 42 has a first end 44 and a second end 46. The first end 44 is secured to the closure member 26 and more specifically, to the rod member 38. For this purpose a hole 48 may be provided in the rod member adjacent the outer end 40. The fishing line first end 44 is then inserted through hole 48 and the line tied to the rod member. The second end 46 of the fishing line is secured to a fishhook 50. In addition, preferably a weight 52 is placed on the fishing line adjacent the second end 46 so as to ensure that when bait is applied to hook 50 and a container 10 cast in the water, the bait will be taken down to the depth provided by the length of fishing line 42.

To improve the ease of storing fishing line 42 on rod member 38, the rod member is preferably provided with reduced width portion 54. This is achieved since in the illustrated arrangement the rod member is flat and has opposed generally paralleled spaced apart edges 56 and 58. The reduced width portion 54 is obtained where the edges have opposed slots therein and this provides a convenient way of receiving fishing line wound thereon as shown in FIG. 2.

The fishing apparatus is normally in the position as shown in FIG. 2, that is, in which the closure member end 28 is threaded onto the container tubular portion 22 and with the rod member 38 having the fishing line with the fishhook and weight thereon wound onto the rod member received internally of the container. It can be easily understood with reference to FIG. 2 that the fishing device is completely safe. The fishhook 50 cannot be inadvertently caught on a person or other object, and the fishing line 42 cannot be inadvertently tangled. Further, when a collapsible container 10 is used, as illustrated, the stored device of FIG. 2 takes up relatively little space.

When the fisherman is ready to use the device, with the understanding in the normal method of "jug fishing" a number of the devices as illustrated in FIGS. 1, 2 and 3 would be utilized simultaneously by fishermen, the fisherman removes the cover 26. He expands the container 10 by pulling on the opposed ends to the shape as shown in FIG. 1. The closure member 26 is then reattached to the container by reversing the ends of the closure member 26 so that the rod member 38 extends externally of the container. Fishing line 42 is unwound from the rod member and a bait (not shown) is attached to hook 50. The device is then merely cast overboard from the fisherman's boat. The expanded container 54 provides large volume to freely float upon the water surface.

When fishing activity is completed, the fishing devices are picked up individually by the fisherman. Bait is removed from the hook 50, and line 42 is wound on the rod member particularly on the reduced width portion 54 thereof. The closure member 26 is then threaded onto the container after it has been collapsed to the condition as shown in FIG. 2 and the device is safely stored. It can be seen that when converting from fishing mode to storage mode and vice versa, the conversion process is expeditious and simple.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for use in catching fish comprising: a container having an opening at one end thereof;

a closure member having opposed first and second ends, either one of which is receivable to close said container opening;

an elongated rod member extending from said closure member first end and being fully receivable within said container when first end is used to close said container;

a fishing line having a first and second end, the first end being affixed to said closure member first end and the fishing line being windable upon said rod member; and a fishing hook affixed to said fishing line second end.

2. A fishing apparatus according to claim 1 wherein said container has an integral reduced diameter tubular portion at one end providing said container opening, said closure member being receivable on said reduced diameter tubular portion.

3. A fishing apparatus according to claim 2 wherein said reduced diameter tubular portion has integral threads and wherein said closure member first and second ends are threaded whereby both said closure member first and second ends are threadably attachable to said tubular portion, said rod member being receivable in said tubular portion.

4. A fishing apparatus according to claim 2 wherein said closure member is an elongated tubular member having a tubular axis, and opposed ends, and having an integral wall intermediate said opposed ends and in a plane substantially perpendicular to said tubular axis and wherein said rod member is affixed to and extends from said wall.

5. A fishing apparatus according to claim 4 wherein said reduced diameter tubular portion has integral threads and wherein said closure member first and second ends are threaded whereby both said closure member first and second ends are threadably attachable to said tubular portion.

6. A fishing apparatus according to claim 1 wherein said container is formed of plastic and is collapsible.

7. A fishing apparatus according to claim 5 wherein said container is formed of plastic and is collapsible.

8. A fishing apparatus according to claim 1 wherein said rod member is of generally rectangular in cross-section taken in planes perpendicular the length thereof.

9. A fishing apparatus according to claim 8 wherein said rod member has opposed, generally paralleled and spaced apart edges, and wherein said edges have opposed slots therein for receiving the winding of said fishing line thereon.

* * * * *